Patented Nov. 20, 1945

2,389,305

UNITED STATES PATENT OFFICE 2,389,305

GLASS COMPOSITION

Raymond W. Goodwin, Cleveland Heights, Ohio, assignor to General Electric Company, a corporation of New York No Drawing. Application September 25, 1943, Serial No. 503,836

3 Claims. (Cl. 106—53)

This invention relates to improved glass-to-metal seals. More particularly, it relates to seals in which the metal component consists of iron. By the term "iron," I intend to refer to any material, such as low carbon steels, which have substantially the expansion characteristics of pure iron. Such materials may include, for example, cold rolled steel, wrought iron, and deep drawing steel. In some instances it may also be desirable to treat the surfaces of the iron parts in order to obtain better adherence between the iron and the glass. For example, one may employ for this purpose a thin coating of copper or silver, or compounds of boron such as boric oxide or borax, or other ceramic or vitreous compositions.

Seals of the type referred to above are useful in the class of application which is typified by lead-in connections for electronic discharge device, electric lamps, and similar devices.

It is an object of this invention to provide an improved glass composition for seals of the above type, and to that end, the present invention relates more particularly to improvements in the glass composition for such seals disclosed in Patent No. 2,272,747—A. W. Hull et al., dated February 10, 1942 and assigned to the assignee of this application. Other objects and advantages will appear from the following description.

In accordance with the above, the glass comprising my invention is a lead glass having the following characteristics and features:

1. A coefficient of thermal expansion which makes it useful for sealing to iron lead wires which may be coated with any of the materials referred to above. Preferably, the coefficient of expansion of the glass is slightly below that of the iron.

2. The use of aluminum oxide as an essential constituent to provide chemical stability against weathering and a long working range which makes the glass easy to draw into tubing.

3. The use of lithium oxide to secure low softening temperature glass for sealing operations.

4. Desirable electrical resistance, which is obtained by keeping the total alkali oxides below 19 per cent as a maximum, but preferably at least about 15 per cent.

5. Adjustment of the expansion characteristics of the glass to the intended use by the proper balance of lead oxide and alkali metal oxides.

The glass comprising the present invention differs from other glasses heretofore suggested in the use of aluminum oxide in amounts of 1 to 8 per cent; the use of lithium oxide to obtain low softening temperature glasses, and the elimination of fluorspar which is common in other glasses of this type.

In accordance with the invention, the glass may have a composition in the following range:

| | |
|---|---|
| $SiO_2$ | 40 to 48 per cent with 45 per cent average in preferred examples |
| $Al_2O_3$ | 1 to 8 per cent |
| $Li_2O$ | 1 to 2.5 per cent |
| $Na_2O$ | 2 to 5 per cent with the sum of $Li_2O+Na_2O$ averaging about 4 per cent |
| $K_2O$ | 12 to 17 per cent |
| Total alkali oxides | Not over 19 per cent |
| PbO | 32 to 38 per cent |

The following is a batch composition and calculated analysis of a preferred glass:

Batch

| | | |
|---|---|---|
| Sand | Pounds | 34 |
| Litharge | do | 27 |
| Aluminum hydrate | do | 2½ |
| Lithium carbonate | do | 2 |
| Soda ash | do | 2 |
| Sodium nitrate | do | 4 |
| Anhydrous potassium carbonate | do | 16 |
| Arsenic | Ounces | 3 |

Calculated analysis

| | Per cent |
|---|---|
| $SiO_2$ | 44.3 |
| PbO | 35.1 |
| $Al_2O_3$ | 2.1 |
| $Li_2O$ | 1.0 |
| $Na_2O$ | 3.1 |
| $K_2O$ | 14.2 |
| $As_2O_3$ | .1 |

What I claim as new and desire to secure by Letters Patent of the United States is:

1. A glass composition suitable for sealing to iron having substantially the following composition:

| | Per cent |
|---|---|
| $SiO_2$ | 40 to 48 |
| PbO | 32 to 38 |
| $Al_2O_3$ | 1 to 8 |
| $Li_2O$ | 1 to 2.5 |
| $Na_2O$ | 2 to 5 |
| $K_2O$ | 12 to 17 | the total alkali oxides being not over 19 per cent.

2. A glass composition suitable for sealing to iron having substantially the following composition:

| | Per cent |
|---|---|
| $SiO_2$ | 40 to 48 |
| PbO | 32 to 38 |
| $Al_2O_3$ | 1 to 8 |
| $Li_2O$ | 1 to 2.5 |
| $Na_2O$ | 2 to 5 |
| $K_2O$ | 12 to 17 | the total alkali oxides being not over 19 per cent, and the sum of $Li_2O$ plus $Na_2O$ about 4 per cent.

3. A glass composition suitable for sealing to iron having substantially the following composition:

| | Per cent |
|---|---|
| $SiO_2$ | 44 or 45 |
| PbO | 35 |
| $Al_2O_3$ | 2 |
| $Li_2O$ | 1 |
| $Na_2O$ | 3 |
| $K_2O$ | 14 |

RAYMOND W. GOODWIN.